Sept. 6, 1955 E. P. HARRIS 2,716,787
FLEXIBLE SEALING STRIP
Filed Dec. 19, 1951

INVENTOR.
Edward P. Harris
BY
his Attorneys

United States Patent Office 2,716,787
Patented Sept. 6, 1955

2,716,787
FLEXIBLE SEALING STRIP

Edward P. Harris, Dayton, Ohio, assignor to General Motors Corporation, Detroit, Mich., a corporation of Delaware Application December 19, 1951, Serial No. 262,354

1 Claim. (Cl. 20—69)

This invention relates to sealing strips and is particularly concerned with flexible sealing strips including integrally formed attaching means associated therewith.

It is the main feature of the invention to provide a resilient, elastomeric sealing strip which includes a resilient, extensible rubber-like reinforcing and attachment strip molded therein and bonded thereto, which attachment strip presents an externally accessible attachment means which may be associated with the support to which the sealing strip is to be assembled whereby the sealing strip is firmly held to said support.

In carrying out the invention, it is another feature to form an attachment strip by extrusion of elastomeric material, for example, natural rubber, synthetic rubber of the copolymer type, etc., wherein the stock is compounded and extruded in the desired cross section and is then positioned in a mold for the sealing strip whereupon foamed latex, for example, is disposed therearound, and then the assembly is subjected to a suitable cure. In this connection, the strip of extruded rubber-like elastomer may be fully cured or partially cured, as desired, prior to placement in the mold, the cure of the latex foam being sufficient to either complete the cure on the extruded strip or being at a lower temperature which has no substantial effect thereon.

Additional features will be apparent, reference being had to the accompanying drawing, wherein preferred embodiments of the invention are clearly shown.

Various types of sealing strips have been suggested for use in connection with automobile doors or other rigid supporting members. In copending application, Serial No. 164,738, and which is now Patent No. 2,579,072, I have disclosed a flexible sealing strip including a reinforcing attachment means molded therein which comprises a zig-zag wire having spaced protruding clips thereon which may be passed through holes or apertures in a supporting member, for example. In my copending application, Serial No. 258,045, an improvement on this strip is disclosed wherein rubber-like material is molded around the base of each of said clips, which rubber-like addition is adapted to be forcibly inserted in the apertures to seal the apertures in the supporting member against ingress of water, air, etc.

In copending application, Serial No. 191,444, which is now Patent No. 2,668,987, in the names of Edward P. Harris and Frederick W. Sampson, there is disclosed one method for making flexible sealing strips of the type disclosed whereas in my copending application, Serial No. 257,444, another method for forming strips of this character is disclosed.

In each and every case with the exception of those applications covering the method of manufacture, the sealing strips include metallic inserts therein which act as attachment means and in each case, this metallic insert is longitudinally extensible due to a zig-zag preform of the wire, whereby the spaced attachment points may be moved longitudinally, within limits, to properly align them with the apertures in the support.

The present invention is directed to an improved structure for a sealing strip wherein no metal is used and wherein all of the desirable properties of the aforementioned sealing strips are obtained without the use of metallic inserts. In this case, the attachment means are provided by utilizing an extruded length of elastomeric material, such as rubber or rubber copolymers which is resilient and extensible within limits and which may be included within the spongy sealing strip, for example. The method of including the insert in the strip may be carried out in a manner similar to that disclosed in the copending process applications mentioned herein.

Figure 1:
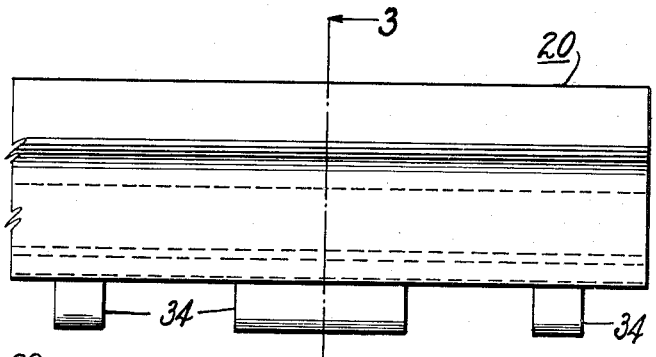
Fig. 1 is a side view of a length of sealing strip showing the holding or attachment means.
Figure 2:
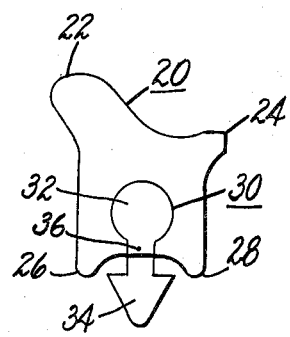
Fig. 2 is an end view of Fig. 1.
Figure 3:
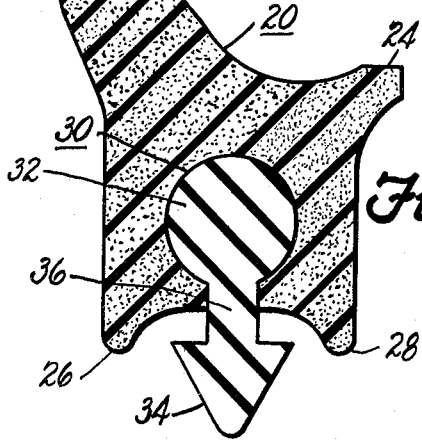
Fig. 3 is an enlarged sectional view of the strip shown in Fig. 1 taken on line 3—3.

Referring particularly to the drawing, a side view of a sealing strip 20 is shown in Figs. 1 and 2 wherein the strip 20 includes a main sealing lip 22 which extends longitudinally outwardly and at an angle therefrom and a smaller sealing lip 24 oppositely disposed longitudinally of the strip. The base of the strip includes two sealing lips 26 and 28 which are compressed when the strip is installed. Attachment and reinforcing means 30 is also integrally formed with the strip and consists of a long, preferably extruded, length of a more dense rubber-like material which includes a bulb portion 32 and a foot 34 connected to the bulb through a relatively narrowed short neck 36. The foot 34 may be notched away to provide any desired number and lengths of attachment points as shown in Fig. 1.

Figure 4:
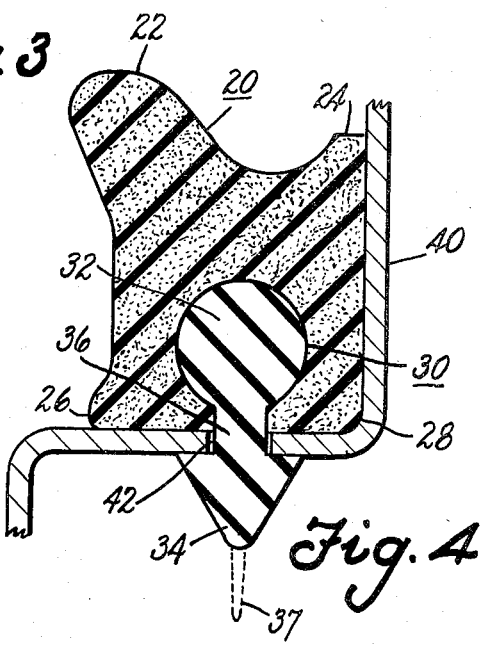
Fig. 4 is a view of the strip shown in Fig. 2 as it appears when attached to a frame member, such as a door frame.

When the strip 20 is attached to a door frame, for example, as shown at 40, the foot portions 34 of the attachment strip 30 are pressed through a plurality of spaced apertures 42 in the frame, the foot portions 34 being shaped in cross section like a spade for example, are easily compressed to pass through the apertures 42 which are larger than the reduced neck portions 36 of the attachment means. This is accomplished by pushing on the strip whereby the neck portion 36 acts as a column to force the foot 34 through the aperture. After the foot portions 34 are passed through the apertures 42, they snap outwardly to form an interlock as shown in Fig. 4. Preferably the external length of the neck 36 is such that the upper portions of the foot 34 are spaced from the strip 20 so that lips 26 and 28 are fully compressed when the strip is in position as shown in Fig. 4 to form a good seal longitudinally of the strip and between the strip and the frame.

It is apparent in this instance that the attachment or reinforcing strip 30, being made of a rubber-like elastomer, is readily extensible whereby the notched out foot portions 34 may be easily positioned in apertures 42 by longitudinally stretching the entire strip 20 and reinforcing means 30. At this time, it is to be understood that he reinforcing insert 30 may be made of any suitable elastomeric material, although it is preferably of a more dense nature than the remainder of strip 20 which is preferably formed from foamed latex or other spongy material although this is not to be considered a limitation. When the strip 20 is spongy in character, it may or may not be coated with an impervious film of resilient material such as neoprene or other synthetic material or plastic such as a vinyl resin.

Figure 5:
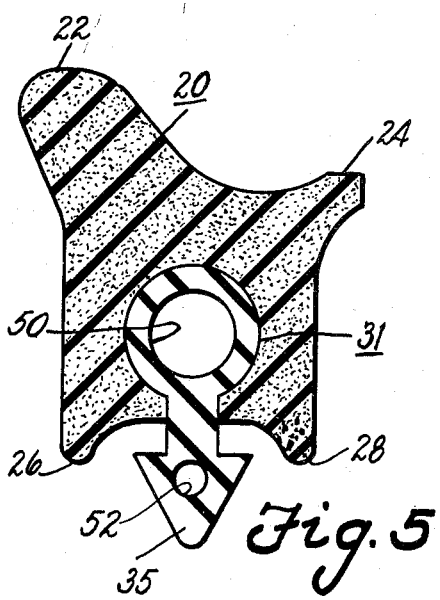
Fig. 5 is a modified form of a strip, such as is shown in Fig. 3.

A modification of the strip 20 is shown in Fig. 5 wherein the only difference is directed to the attachment strip 31 which now includes a longitudinal bore 50 running through the bulb portion 33 and in some instances also including a longitudinally extending bore 52 passing through the foot portion 35. The bores 50 and 52 make the associated portion more or less tubular whereby greater compressibility and extensibility, etc., are apparent, these modifications being a matter of choice as indicated by the specific application.

The exact design of the reinforcing strip 30 is of no particular import here. It is apparent that the foot may embody many designs to accomplish an interlock with the apertures 42 and the strip per se may be made in any desired shape, the particular shape disclosed being easily accomplished in a tuber and being entirely satisfactory for one use in the sealing strip. For these reasons, it is to be understood that the particular cross sectional shape of the attachment or reinforcing member 30 is not limited to that shown in the drawing, nor is the cross sectional shape of the sealing strip so limited.

In the manufacture of the strip, the member 30 is preferably extruded and in most cases is partially cured prior to assembly in the remainder of the strip. I prefer to use a 70 to 80 hard rubbery insert 30 which is preferably notched before curing. However, this is a matter of choice and the hardness of the insert 30 may vary as desired. Bq partially curing the insert 30 prior to its inclusion in the foamed rubber strip, the insert becomes completely cured during the cure of the foam rubber. However, since the foam is generally cured at a lower temperature than the rubber-like material of the insert, it is possible in some cases to fully cure the reinforcing strip prior to assembly, in which case very little overcure is noted. All of these modifications and variations however come fully within the skill of any rubber compounder, and form no part of this invention.

The sealing strip per se is made of any deformable rubber-like material, preferably foamed latex material which may be gelled either by a delayed coagulant or by use of a heat sensitizing agent in the compound. Such latices as those of natural rubber, butadiene-styrene copolymer, butadiene-acrylonitrile copolymer, neoprene, mixtures thereof or for that matter any latex which will provide a spongy elastomeric material upon curing may be used. The same types of elastomers may be used in the manufacture of the insert strip, although as mentioned before, this is preferably an extruded product rather than a spongy one, although it is fully within the scope of my invention to utilize a sponge rubber insert strip, the basis for the invention being the use of an insert strip within a sealing strip wherein the two strips are preferably of different hardnesses and wherein the insert strip includes attachment means thereon.

In some cases, the attachment means may be used without notching, thereby presenting a continuous attachment to be associated with a slot or groove in the supporting member or to be grasped by clamping means. Where access to the inner side of the supporting member is available, it may also be desirable to extrude a fin 37 (shown in dotted lines) on the foot 34, which fin can be passed through the aperture or slot, grasped by the assembler and pulled to pull the foot portion 34 through the attachment point. During the pulling operation, the neck 36 and foot 34 are elongated for reducing their cross section slightly, thereby making passage through the slot or aperture more facile.

While the embodiments of the present invention as herein disclosed, constitute preferred forms, it is to be understood that other forms might be adopted.

What is claimed is as follows:

A flexible longitudinally extensible sealing strip adapted to be attached and mounted to a more rigid mounting member having means for mechanically holding a portion of the strip thereto, said strip comprising a resiliently deformable body of rubber-like material of the desired cross section forming the main body of the strip, a longitudinally extending, resiliently deformable part of rubber-like material of greater hardness than the main body portion of the strip and at least partially embedded in and bonded to said body portion, said longitudinally extending, resiliently deformable part being of tubular cross section with respect to that portion thereof that is embedded in the strip and having a longitudinally extending portion exteriorly accessible and integrally formed therewith for providing an interlock with said holding means for holding the strip to the member.

References Cited in the file of this patent

UNITED STATES PATENTS

| | | |
|---|---|---|
| 1,705,455 | Griffiths | Mar. 12, 1929 |
| 1,877,729 | Chaffee | Sept. 13, 1932 |

FOREIGN PATENTS

| | | |
|---|---|---|
| 102,938 | Australia | Jan. 10, 1938 |